(No Model.)
A. F. HIPP.
HOOF PAD.
No. 362,215. Patented May 3, 1887.
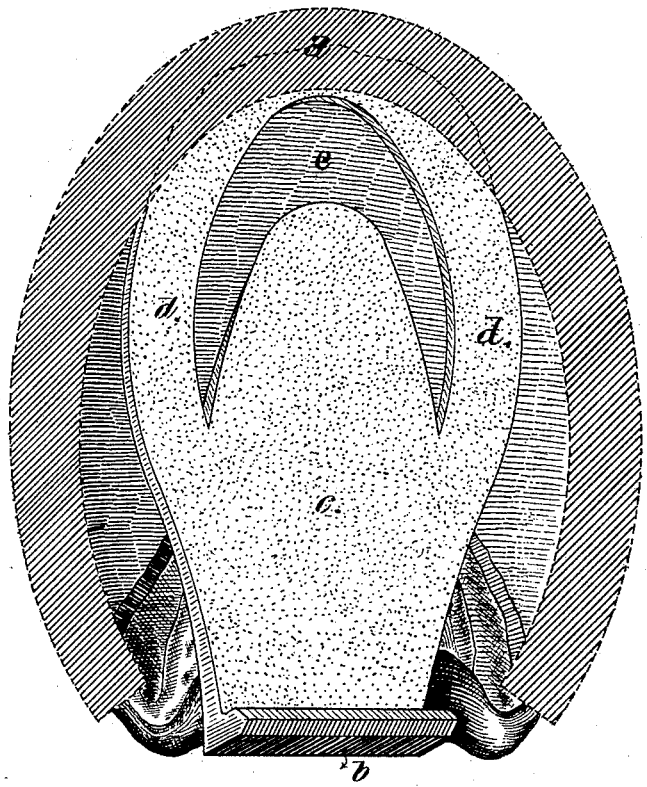
Witnesses,
C. H. Koeppe
Matilda Emmert
Inventor,
August F. Hipp

UNITED STATES PATENT OFFICE.

AUGUST F. HIPP, OF TOLEDO, OHIO.

HOOF-PAD.

SPECIFICATION forming part of Letters Patent No. 362,215, dated May 3, 1887.

Application filed January 22, 1887. Serial No. 225,061. (No model.)

*To all whom it may concern:*

Be it known that I, AUGUST F. HIPP, of Toledo, in the county of Lucas and State of Ohio, have invented certain new and useful Improvements in Frog-Plates for Horses' Hoofs, of which the following is a specification.

This invention relates to an improved frog-plate that is fastened to a horseshoe and resting upon the frog, thereby enabling the shoer to place less weight on the quarters, (the weakest part of the foot.)

The object of my invention is to provide a frog-plate which is so constructed that the pressure can be so regulated and placed on all prominent parts as nature designed, thereby preventing the production of corns, contracted heels, quarter-cracks, and injury to the navicular joint, all parts receiving a portion of the horse's weight. As the frog-plate is made of a steel-plate spring, with or without a calk, at the posterior or free extremity, the smith is enabled to increase the pressure upon the frog, thereby lessening that on the quarters, or decrease the pressure upon the frog and thereby increasing the weight upon said quarters.

The invention consists of a frog-plate fastened to or connected with the shoe at the front part and extending to the rear part of the hoof, said spring-plate being provided with an approximately V-shaped slot in its front portion and with a calk attached to the rear end.

In the accompanying drawings the under side of a horse's foot is shown, being provided with my improved frog-plate.

In the drawings, $a$ represents the horseshoe. The frog-plate $c$ is made of spring-steel, and increases in thickness from the anterior to the posterior end, the front part being securely welded or otherwise fastened to the front part of the horeshoe $a$. The frog-plate is provided with an approximately V-shaped slot, $e$, forming two side shanks, $d\ d$, in its anterior portion, and with a calk, $b$, at the posterior end. By changing the height of the calk $b$ the pressure can be regulated, and hence distributed at will over more or less surface on the under part of the foot, it being evident that when the calk is higher less pressure is being exercised upon the quarters, whereas if the calk is lower more pressure is placed upon the quarters, (the weakest part of the foot.) As the frog-plate is made of steel and increasing in thickness from front to rear, it forms an elastic bearing which stimulates the frog to continual growth and thereby prevents contraction of the hoof.

Having thus described my invention, I claim as new and desire to secure by Letters Patent—

1. A frog-plate for horseshoes, consisting of a metal spring-plate fastened to the front part of the shoe, said metal spring-plate having an approximately V-shaped slot in its front part and a calk at its rear end, substantially as shown and described.

2. A frog-plate for horseshoes, consisting of a metal spring-plate fastened to the front part of the shoe, which metal spring-plate has an approximately V-shaped slot in its rear end, the thickness of the plate increasing from the front toward the rear, substantially as shown and described.

In testimony that I claim the foregoing as my invention I have signed my name in presence of two subscribing witnesses.

AUGUST F. HIPP.

Witnesses:
T. J. McDONNELL,
N. HADNETT.